United States Patent [19]
Shiragaki

[11] Patent Number: 5,457,556
[45] Date of Patent: Oct. 10, 1995

[54] OPTICAL CROSS-CONNECT SYSTEM WITH SPACE AND WAVELENGTH DIVISION SWITCHING STAGES FOR MINIMIZING FAULT RECOVERY PROCEDURES

[75] Inventor: Tatsuya Shiragaki, Tokyo, Japan

[73] Assignee: NEC Corporation, Japan

[21] Appl. No.: 228,724

[22] Filed: Apr. 18, 1994

[30] Foreign Application Priority Data

Apr. 16, 1993 [JP] Japan ................................ 5-089013

[51] Int. Cl.$^6$ ................................ H04J 14/00; H04J 4/00
[52] U.S. Cl. ...................... 359/117; 359/123; 359/128; 359/139
[58] Field of Search ............................... 359/110, 117, 359/123, 128, 139, 124, 135; 385/16, 24

[56] References Cited

U.S. PATENT DOCUMENTS

| | | | |
|---|---|---|---|
| 5,005,166 | 4/1991 | Suzuki et al. | 359/117 |
| 5,144,465 | 9/1992 | Smith | 359/117 |
| 5,175,777 | 12/1992 | Böttle | 359/128 |
| 5,303,077 | 4/1994 | Böttle et al. | 359/117 |

Primary Examiner—David K. Moore
Assistant Examiner—Kinfe-Michael Negash
Attorney, Agent, or Firm—Laff, Whitesel, Conte & Saret, Ltd.

[57] ABSTRACT

In an optical cross-connect system, incoming and outgoing fiber optic trunks carrying WTDM signals are terminated to first inlet ports and first outlet ports of an optical space switch. A wavelength division demultiplexer is connected to a second outlet port of the optical space switch and a wavelength division multiplexer is connected to a second inlet port of the optical space switch. A wavelength-divided space switch has first inlet ports connected to the outputs of the wavelength division demultiplexer and first outlet ports connected to the inputs of the wavelength division multiplexer. A time division demultiplexer is connected to a second outlet port of the wavelength-divided space switch and a time division multiplexer is connected to a second inlet port of the wavelength-divided space switch. The outputs of the time division demultiplexer are connected to first inlet ports of a time switch and the inputs of the time division multiplexer are connected to first outlet ports of the time switch. The time switch has second inlet ports and second outlet ports connected to a switched network.

13 Claims, 9 Drawing Sheets

OPTICAL CROSS-CONNECT SYSTEM WITH SPACE AND WAVELENGTH DIVISION SWITCHING STAGES FOR MINIMIZING FAULT RECOVERY PROCEDURES

BACKGROUND OF THE INVENTION

1. Field of the Invention

The present invention relates generally to wavelength routed communications networks, and more specifically to an optical cross-connect system for switching wavelength division multiplexed signals.

2. Description of the Related Art

A known optical cross-connect system, as described in a paper "Reconfigurable Wavelength Routed Optical Networks: a Field Demonstration", H. J. Westlake at al., ECOC '91 proceedings Vol. 1, pages 753 to 756, includes an optical space switch, a plurality of wavelength division demultiplexers, and a plurality of wavelength division multiplexers. As shown in FIG. 1, wavelength time division multiplexed (WTDM) channels on incoming fiber optic trunks are demultiplexed into wavelength-divided channels by demultiplexers 2 and appear at the inlet ports of the optical space switch 1. Some of the wavelength-divided channels are switched to the wavelength division multiplexers 3 and then routed to outgoing fiber optic trunks, and others are routed to an electronic cross-connect system 4 where they are time-division demultiplexed for add/drop multiplexing. Links are established in the switch 1 so that the wavelength numbers on the inlet side correspond to those of the outlet side. If a fault occurs on an outgoing trunk 5 and a spare outgoing trunk 6 is available, links x1, y1 and z1 leading to the trunk 5 will be cleared and new links x2, y2 and z2 established to the spare trunk 6. Since this fault recovery procedure involves one or more downstream nodes and a close coordination is necessary to determine the alternate links in the associated nodes, and a complex, inefficient recovery procedure will result. If it is desired to restore all of the failed links, it will be necessary to provide as many spare wavelength-divided channels as there are working wavelength-divided channels.

SUMMARY OF THE INVENTION

It is therefore an object of the present invention to provide an optical cross-connect system capable of reconfiguring network routes in a flexible manner so that recovery procedures are minimized in the event of a fault.

According to a first aspect, the present invention provides an optical cross-connect system comprising an optical space switch having a plurality of first inlet ports, a second inlet port, a plurality of first outlet ports and a second outlet port for establishing links between any of the inlet ports and any of the outlet ports, the first inlet ports being connected to incoming optical trunks and the first outlet ports being connected to outgoing optical trunks, each of the incoming optical trunks and each of the outgoing optical trunks carrying a wavelength division multiplexed signal. A wavelength division demultiplexer is connected to the second outlet port of the optical space switch and a wavelength division multiplexer is connected to the second inlet port of the optical space switch. A wavelength-divided space switch is provided having a plurality of first inlet ports, a plurality of second inlet ports, a plurality of first outlet ports and a plurality of second outlet ports for establishing links between any of the inlet ports and any of the outlet ports. The first inlet ports of the wavelength-divided space switch are connected to the outputs of the wavelength division demultiplexer, and the first outlet ports of the wavelength-divided space switch are connected to the inputs of the wavelength division multiplexer. The second inlet ports and the second outlet ports of the wavelength-divided space switch are adapted for connection to a switched network.

If a fault occurs in one of the optical trunks, the optical space switch can be controlled to re-route a failed wavelength-muitiplexed channel without decomposing it into wavelength components. If a fault occurs in one of the wavelengths of a wavelength-multiplexed channel, the wavelength-divided space switch is controlled to re-route the failed wavelength to a spare wavelength-divided channel, instead of re-routing the entire wavelength-multiplexed channel.

According to a second aspect, the present invention provides an optical cross-connect system comprising an optical space switch having a plurality of first inlet ports, a second inlet port, a plurality of first outlet ports and a second outlet port for establishing links between any of the inlet ports and any of the outlet ports. The first inlet port are connected to incoming optical trunks and the first outlet ports are to outgoing optical trunks, each of the incoming optical trunks and each of the outgoing optical trunks carrying a wavelength time division multiplexed signal. A a wavelength division demultiplexer is connected to the second outlet port of the optical space switch and a wavelength division multiplexer is connected to the second inlet port of the optical space switch. A wavelength-divided space switch has a plurality of first inlet ports, a second inlet port, a plurality of first outlet ports and a second outlet port for establishing links between any of the inlet ports and any of the outlet ports. The first inlet ports of the wavelength-divided space switch are connected to the outputs of the wavelength division demultiplexer, the first outlet ports of the wavelength-divided space switch being connected to the inputs of the wavelength division multiplexer. A time division demultiplexer is connected to the second outlet port of the wavelength-divided space switch and a time division multiplexer is connected to the second inlet port of the wavelength-divided space switch. A time switch is provided having a plurality of first inlet ports, a plurality of second inlet ports, a plurality of first outlet ports and a plurality of second outlet ports for establishing links between any of the inlet ports and any of the outlet ports. The first inlet ports of the time switch are connected to the outputs of the time division demultiplexer and the first outlet ports of the time switch are connected to the inputs of the time division multiplexer. The second inlet ports and second outlet ports of the time switch are adapted for connection to a switched network.

If a fault occurs in one of the optical trunks, the optical space switch can be controlled to re-route a failed wavelength-multiplexed channel without decomposing it into wavelength components. If a fault occurs in one of wavelength components of a wavelength-multiplexed channel, the wavelength-divided space switch is controlled to re-route the failed wavelength to a spare wavelength-divided channel, instead of re-routing the wavelength-muitiplexed channel. If a fault occurs in one of the time slots of a wavelength-divided channel, the failed time-divided channel is re-routed to a spare time-divided channel, instead of re-routing the wavelength-divided channel.

According to a third aspect, the present invention provides a network management system having a network center and a plurality of network nodes. Each of the network nodes comprises an optical cross-connect system comprising an optical space switch having a plurality of first inlet ports, a second inlet port, a plurality of first outlet ports and a second outlet port for establishing links between any of the inlet ports and any of the outlet ports, the first inlet ports being connected to incoming optical trunks and the first outlet ports being connected to outgoing optical trunks, each of the incoming optical trunks and each of the outgoing optical trunks carrying a wavelength division multiplexed signal. A wavelength division demultiplexer is connected to the second outlet port of the optical space switch and a wavelength division multiplexer is connected to the second inlet port of the optical space switch. A wavelength-divided space switch is provided having a plurality of first inlet ports, a plurality of second inlet ports, a plurality of first outlet ports and a plurality of second outlet ports for establishing links between any of the inlet ports and any of the outlet ports. The first inlet ports of the wavelength-divided space switch are connected to the outputs of the wavelength division demultiplexer, and the first outlet ports of the wavelength-divided space switch are connected to the inputs of the wavelength division multiplexer. The second inlet ports and the second outlet ports of the wavelength-divided space switch are adapted for connection to a switched network. The network node further includes fault detector for detecting a fault in the cross-connect system and reporting the detected fault to the network center, and a control circuit for controlling at least one of the optical space switch and the wavelength-divided space switch in response to a command signal from the network center indicating a location of the fault in the cross-connect system and recovering the fault.

According to a fourth aspect, the present invention provides a network management system having a network center and a plurality of network nodes. Each of the network nodes comprises an optical cross-connect system comprising an optical space switch having a plurality of first inlet ports, a second inlet port, a plurality of first outlet ports and a second outlet port for establishing links between any of the inlet ports and any of the outlet ports. The first inlet port are connected to incoming optical trunks and the first outlet ports are to outgoing optical trunks, each of the incoming optical trunks and each of the outgoing optical trunks carrying a wavelength time division multiplexed signal. A a wavelength division demultiplexer is connected to the second outlet port of the optical space switch and a wavelength division multiplexer is connected to the second inlet port of the optical space switch. A wavelength-divided space switch has a plurality of first inlet ports, a second inlet port, a plurality of first outlet ports and a second outlet port for establishing links between any of the inlet ports and any of the outlet ports. The first inlet ports of the wavelength-divided space switch are connected to the outputs of the wavelength division demultiplexer, the first outlet ports of the wavelength-divided space switch being connected to the inputs of the wavelength division multiplexer. A time division demultiplexer is connected to the second outlet port of the wavelength-divided space switch and a time division multiplexer is connected to the second inlet port of the wavelength-divided space switch. A time switch is provided having a plurality of first inlet ports, a plurality of second inlet ports, a plurality of first outlet ports and a plurality of second outlet ports for establishing links between any of the inlet ports and any of the outlet ports. The first inlet ports of the time switch are connected to the outputs of the time division demultiplexer and the first outlet ports of the time switch are connected to the inputs of the time division multiplexer. The second inlet ports and second outlet ports of the time switch are adapted for connection to the switched network. The network node further includes a fault detector for detecting a fault in the cross-connect system and reporting the detected fault to the network center, and a control circuit for controlling at least one of the optical space switch, the wavelength-divided space switch and the time switch in response to a command signal from the network center indicating a location of the fault in the cross-connect system and recovering the fault.

BRIEF DESCRIPTION OF THE DRAWINGS

The present invention will be described in further detail with reference to the accompanying drawings, in which.

DETAILED DESCRIPTION

Figure 1:
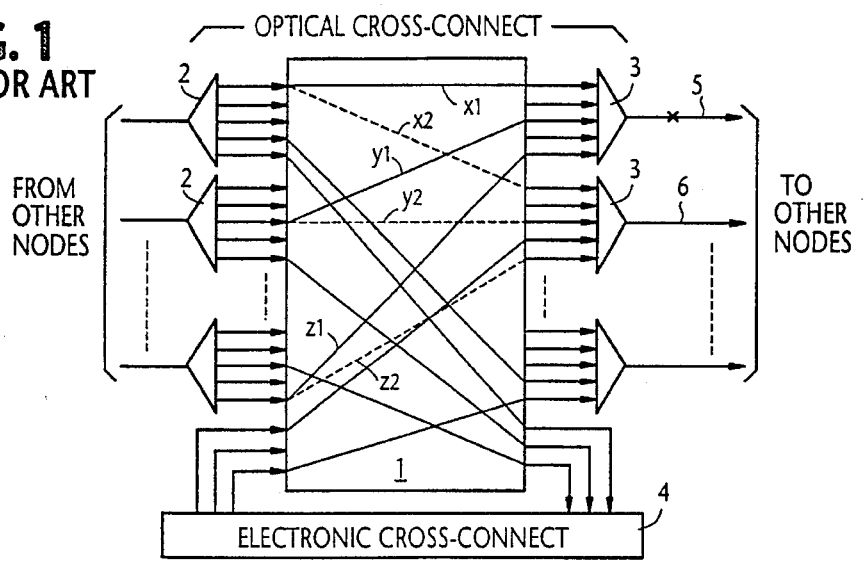
FIG. 1 is a schematic block diagram of a prior art optical cross-connect system.
Figure 2:
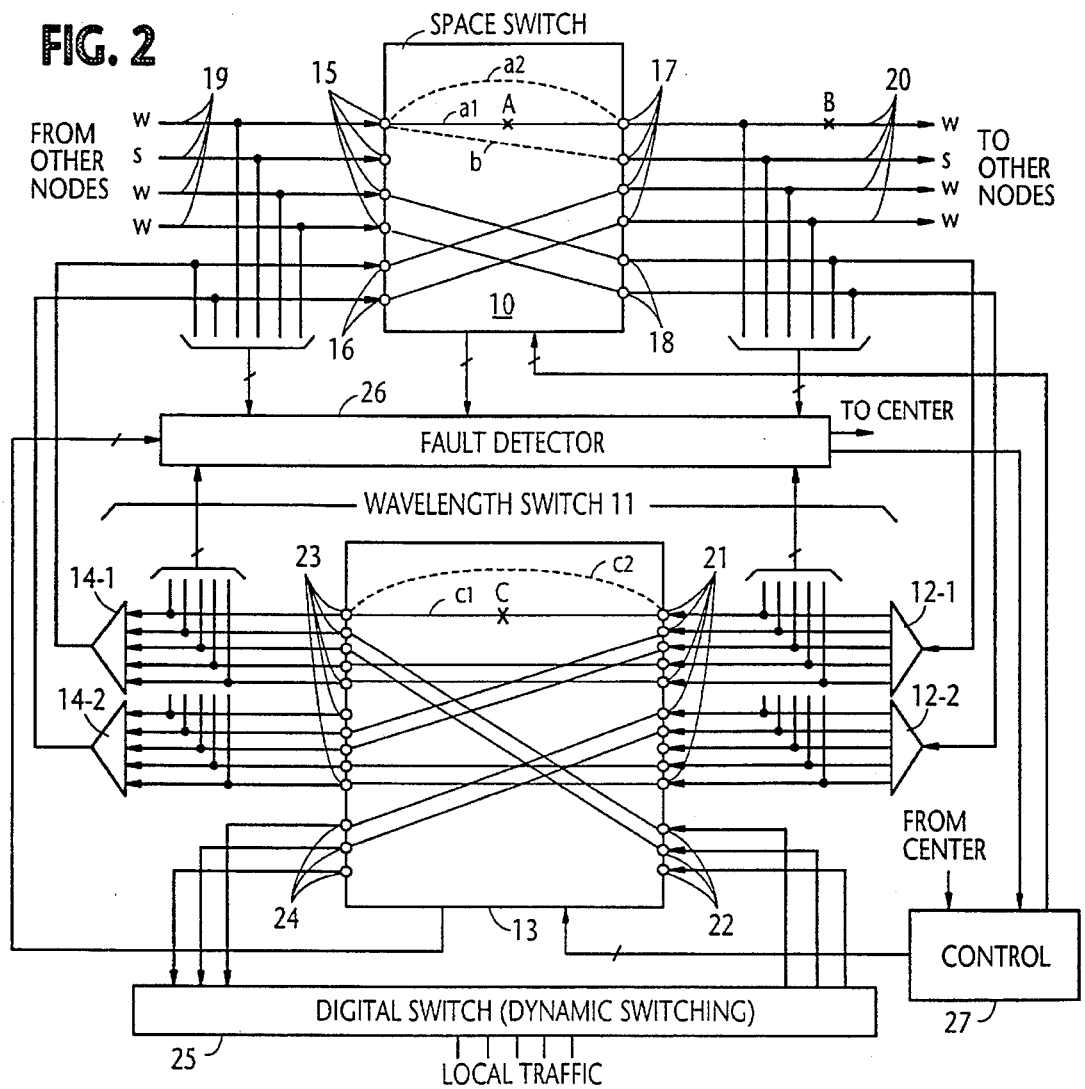
FIG. 2 is a block diagram of a WDM (wavelength division multiplex) cross-connect system according to a first embodiment of the present invention.

In FIG. 2, a digital cross-connect system according to one embodiment of the present invention for wavelength division multiplexed signals is illustrated. The system comprises a space division switch 10 and a wavelength division switching network 11 implemented with a plurality of wavelength-division demultiplexers 12-1 and 12-2, a space switch 13, and a plurality of wavelength-division multiplexers 14-1 and 14-2. Space switch 10 has first and second groups of inlet ports 15 and 16 and first and second groups of outlet ports 17 and 18 incoming trunks 19 from other network nodes are terminated to the first group of inlet ports 15 and the outputs of multiplexers 14-1 and 14-2 are connected to the second group of inlet ports 16. The first group of outlet ports 17 of the space switch is connected to outgoing trunks 20 to other network nodes and the second group of the outlet ports 18 is connected to the inputs of demultiplexers 12-1 and 12-2. Space switch 10 is preferably implemented with multiple stages interconnected in a nonblocking configuration so that a sufficient amount of links is established for supporting full load traffic with zero link blocking probability. It is also designed to additionally provide spare links for purposes of protection switching when some of the working links of the switch 10 should fail. The incoming and outgoing trunks are marked by letters "w" and "s" for indicating whether they are in a working or a standby state.

Similar to the space division switch 10, the wavelength space switch 13 of the wavelength-division switch 11 has a first group of inlet ports 21 to which the outputs of all demultiplexers 12 are connected and a second group of inlet ports 22 to which is supplied the outgoing traffic of a digital switch 25 which interfaces between the cross-connect system and a switched telephone network. At the outgoing side, the wavelength space switch 13 has a first group of outlet ports 23 connected to the inputs of all multiplexers 14 and a second group of outlet ports 24 for supplying the incoming traffic of digital switch 25. Wavelength space switch 13 is likewise implemented with multiple stages of nonblocking configuration with additional spare links for protection switching.

With the arrangement just described, some of incoming transit traffic from upstream nodes that appear at inlet ports 15 can be directly switched through the space switch 10 to downstream nodes via the outlet ports 17 without being decomposed into their individual components and others may be switched via the outlet ports 18 to demultiplexers 12, where they are decomposed into signals of lower level of multiplexing or baseband signals. The decomposed signals of each multiplex group appear at the inlet ports 21 of wavelength space switch 13. Some of these decomposed signals may be switched through the outlet ports 23 to any of the demuitiplexers 14 where they are multiplexed with other signals into a signal of higher multiplex level and applied to the inlet ports 16 of space switch 10 where it is switched to one of the outlet ports 17. Some of the signals decomposed by the demultiplexers 12 may appear at the outlet ports 24 of wavelength space switch 13 and switched to the digital switch 25 as incoming traffic into the switched network. In addition, outgoing traffic from the digital switch 25 appears at the inlet ports 22 of switch 13 and routed to the outlet ports 23 and multiplexed with other signals by one or more multiplexers 14 to comprise part of the signals that are applied to the inlet ports 16 of optical space switch 10.

The optical cross-connect system includes a fault detector 26 for collecting data from all strategic points of the system to monitor data streams. Specifically, it is connected to all inlet outlet ports of switch 10 and to strategic points of the internal structure of the switch 10 to detect a line fault and a link failure that affect on a multiplexed signal and notifies a network maintenance center, not shown, of a failure detected on a higher level of multiplex. Fault detector 26 is further connected to the outputs of all demultiplexers 12 and to the inputs of all multiplexers 14 and to strategic points of the internal structure of switch element 13 to monitor demultiplexed data streams and informs the network center of the location of a failure on a lower level of multiplex. The network maintenance center analyzes information received from network nodes and precisely identifies the location of the fault and, in response, it issues a node command to the network nodes concerned. A control circuit 27 is provided for receiving the node command signal. If a failure can be recovered locally without involving an adjacent network node, no report is communicated from the fault detector 26 to the network center. Instead, it notifies the control circuit 27 of the occurrence of a local failure.

In response to a node command signal from the network center or a local command signal from fault detector 26, control circuit 27 controls the links of the space division switch 10 and/or switch element 13 so that the switches are partially reconfigured and protection switching occurs from a faulty channel to a spare channel. The network center maintains a lookup table for each network node that maps relationships between the link numbers, inlet and outlet port numbers of all the space switches of the node and other strategic circuit points of the node and holds a map indicating working and spare status of all links of the node and working and spare status of all trunks to and from the node. When an failure event report is received from a node, the network center looks up appropriate tables, finds a recovery path and notifies the nodes concerned of the recovery path.

More specifically, if a failure occurs in switch 10 as indicated at A on a working link a1, fault detector 26 searches for a spare link a2 and issues a switching command signal to the space switch 10 to provide protection switching from link a1 to link a2. If a failure as marked B occurs on one of the outgoing trunks 20 which is established through link a1, an adjacent node reports the trunk fault to the network center. In response, the network center analyzes the report and specifies a spare trunk, and sends back node command signals to the network nodes concerned. Control circuit 27 receives one of this node command signals and instructs the space switch 10 to switch from link a1 to link b that is connected to the spare trunk that is specified by the network center. A similar event occurs in the adjacent node to switch the faulty trunk route to the trunk specified by the network node. Protection trunk switching is accomplished in this way without having the trouble of decomposing the failed multiplex signal into component signals for rerouting them to spare channels.

If a failure occurs in the wavelength (time) switch 13 as marked C on a link c1 which is established between demultiplexer 12-1 and multiplexer 14-1, the fault detector 26 searches for a spare link c2 and instructs the space switch 13 to switch the faulty link to the spare link c2. In this manner, a failure of a lower multiplex signal or a baseband signal is recovered without involving the switch 10 that carries higher multiplex level signals.

A recovery procedure for a failure that occurs at the inputs of each demultiplexer 14 or at the outputs of each multiplexer 12 will be described below with reference to FIG. 3 by assuming that the lower-multiplex-level switch 11 is a wavelength division switch using an optical space switch 13 which provides switching of optical signals of different wavelength and that a failure marked Da has occurred at the λ1 input of multiplexer 14-1 or a failure marked Db has occurred at the λ1 output of multiplexer 12-1. It is further assumed that, in node A, switch 13A has a spare port 31 at the λ2 input of multiplexer 14-1A and spare ports 32 and 33 at the λ1 and :λ3 inputs of multiplexer 14-2A. In node B, switch 13B has a spare port 37 at the λ2 input of demultiplexer 12-1B and spare ports 38 and 39 at the λ1 and λ3 inputs of demultiplexer 12-2B. Links are normally established in switch 13 between the inlet and outlet ports of the same wavelength numbers so that a signal of wavelength $\lambda_i$ of any demultiplexer can be switched to the input of any multiplexer bearing the same wavelength $\lambda_i$.

If a fault at Da occurs at a point between port 34 and the associated λ1 input of demultiplexer 14-1A, the fault detector 26 at node A communicates this fact to the network center. Since the failed signal has been transported on route 20a and passed through demultiplexer 12-1B to the output of its demultiplexer 14-1B, the fault detector 26 of node B simultaneously recognizes that there is a loss of signal at the λ1 output of demultiplexer 12-1B, as if it were caused by a fault at a point marked Db, and communicates this fact to the network center. A similar event will occur in downstream nodes and the network center will be additionally notified of such events from the downstream nodes.

On receiving the reports from nodes A and B as well as from the downstream nodes, the network center identifies the upstream node A as the location of the failure and looks up the status memory to analyze the current working and idle status of the input and output ports of nodes A and B and issues node command signals by specifying the spare port 32 at node A and the corresponding spare port 38 at node B as alternate ports for fault recovery.

At node A, control circuit 27 responds to the node command signal to control space switch 13 so that it establishes a link d2 from inlet port 35 to outlet port 32 and clears the current link d1 which has been established from the port 35 to outlet port 34, thus switching the communication channel from link d1 to link d2. Likewise, at node B, space switch 13B establishes a link d6 from port 38 to port 40 and clears the current link d5 which has been established from port 36 to port 40, switching the communication channel from link d5 to link d6.

Therefore, the signal at the λ1 output of demultiplexer 12-1A is switched to link d2, combined with the λ2 to λ5 inputs of multiplexer 14-2A and transported on route 20b and appears at the λ1 output of demultiplexer 12-2B where it is switched on link d6 to port 40 and multiplexed with the signals of the original group.

If there are no spare ports nodes A and B bearing the same wavelength as that of the failed port, wavelength conversion is necessary for fault recovery procedure. For this purpose, the wavelength switch 11 of each node further includes tunable wavelength converters 30-1 and 30-2 each being connected between respective outlet and input ports of switch 13. Switching control signal is supplied from the control circuit 27 to the wavelength converters 30. Regardless of the original wavelength, each tunable wavelength converter 30 provides conversion of optical signal to a wavelength specified by the switching control signal.

Assume that port 32 is not available for fault recovery and the network center has specified port 31 at node A and port 37 at node B bearing wavelength number λ2 for establishing an alternate route. In such instances, node A selects one of the wavelength converters, say, 30-1A and establishes a link d3 from port 35 to the input of the selected wavelength converter 30-1A and goes on to establish a link d4 from the output of wavelength converter 30-1A to the specified port 31. Wavelength converter 30-1A is controlled to convert the wavelength λ1 of the input signal to λ2. The output of converter 30-1A is applied through link d4 to port 31 and multiplexed by multiplexer 14-1A.

At node B, wavelength converter 30-1B, for example, is selected and a link d7 is established from port 37 to the input of the selected wavelength converter 30-1B and a link d8 from the output of wavelength converter 30-1B to the specified port 37. Wavelength converter 30-1B is controlled to convert the wavelength λ2 of the input signal to λ1. The output of converter 30-1B is applied through link d8 to port 40 and multiplexed with the λ2 to λ5 signals of multiplexer 14-1B. By the provision of tunable wavelength converters 30, communication channel can be switched to any spare port.

It is seen therefore that if a fault occurs at point Db, rather than at point Da, the above-mentioned fault recovery process will be performed as long as the same spare ports are available at adjacent nodes A and B.

Figure 4:
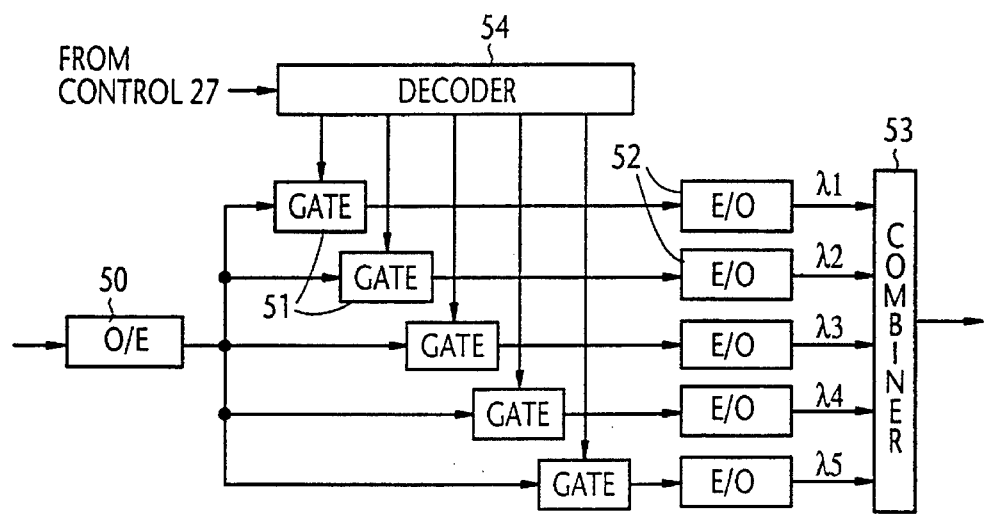
FIG. 4 is a block diagram of a tunable wavelength converter.

As shown in FIG. 4, each of the tunable wavelength converters 30 includes an optoelectrical converter 50, or photodiode having an input connected to the associated output port of switch 13. Transmission gates 51 are provided having their inputs connected together to the output of photodiode 50. Electrooptical converters 52, or laser diodes of different wavelengths are connected respectively to the outputs of gates 51. The output of each laser diode 52 is connected by a combiner 53 to the associated input port of switch 13. A decoder 54 is responsive to a switching command signal from control circuit 27 to open one of the transmission gates so that the output of photodiode 50 is applied to a desired laser diode 52 where it is converted to an optical signal of desired wavelength.

Figure 3:
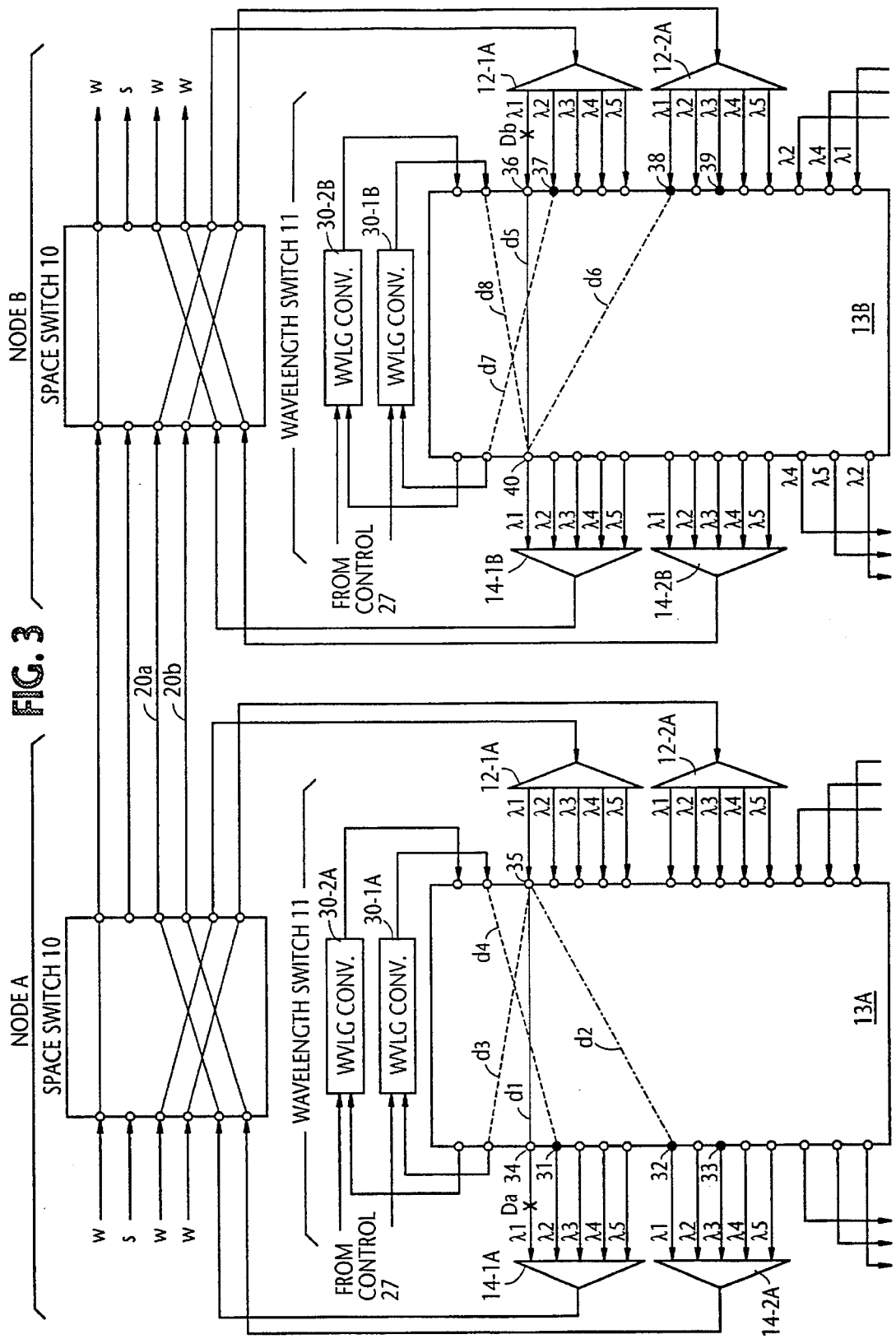
FIG. 3 is a block diagram of adjacent network nodes cooperating with each other for recovering a wavelength associated fault using tunable wavelength converters.
Figure 5:
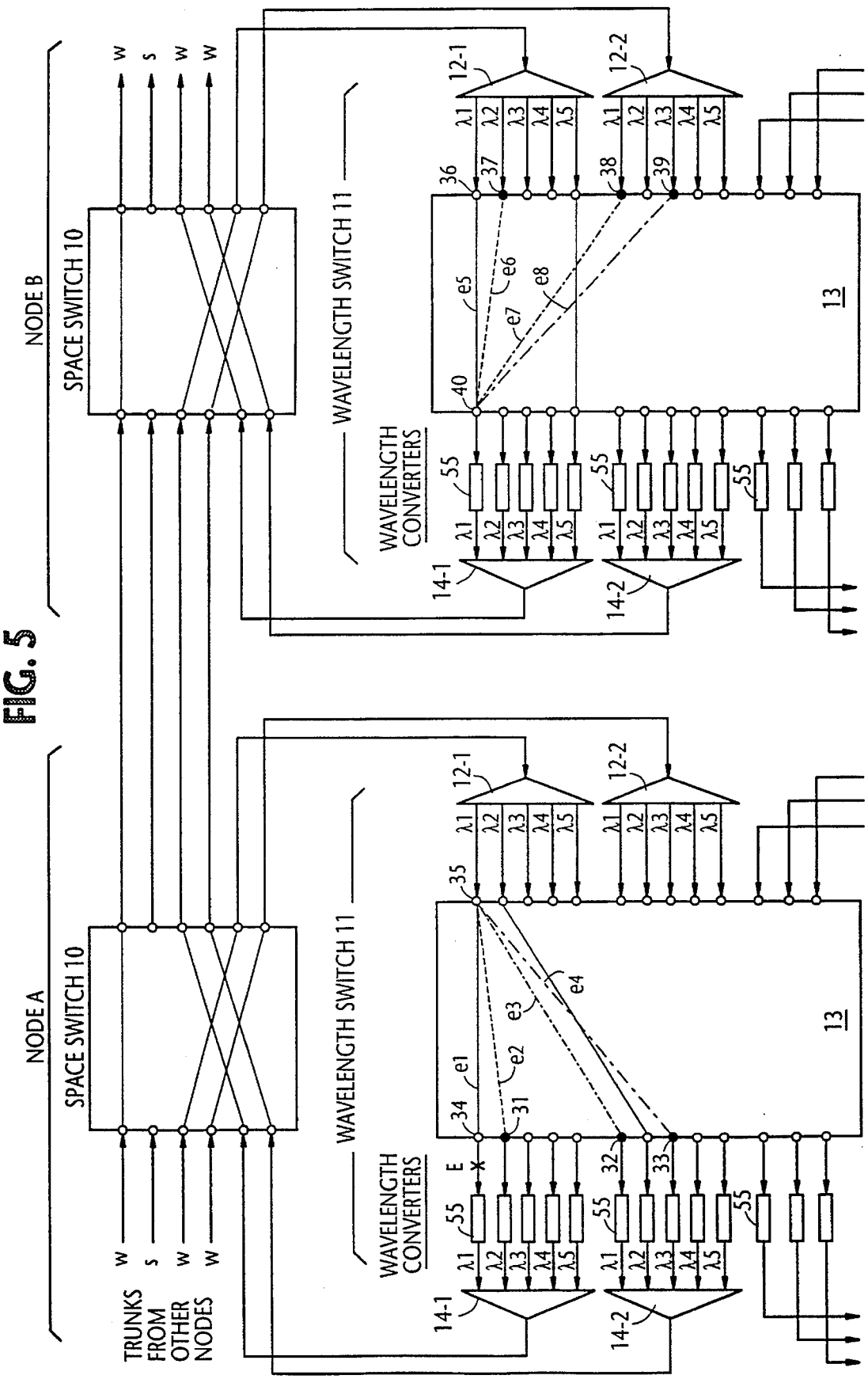
FIG. 5 is a block diagram of adjacent network nodes cooperating with each other for recovering a wavelength associated fault using fixed wavelength converters.

The embodiment of FIG. 3 is modified as shown in FIG. 5 in which a plurality of fixed wavelength converters 55 are connected respectively to the outlet ports of switch 13, instead of the tunable wavelength converters 30. Each of the fixed wavelength converters performs conversion of wavelength from any input wavelength to the particular wavelength of the outlet port to which the wavelength converter is connected.

If a fault occurs at point Ea at node A, the communication channel can be switched from link e1 to any of links e2, e3 and e4. Likewise, at node B, the communication channel can be switched from link e5 to any of links e6, e7 and e8, corresponding respectively to links e2, e3 and e4. If the path at node A is switched to link e2, it is switched at node B from link e5 to link e6, so that the λ1 signal from port 35 at node A is converted to a λ2 signal by the wavelength converter that is connected to port 31 and, following transmission, appears at inlet port 37 at node B, where it is passed on link e6 to port 40.

Figure 6:
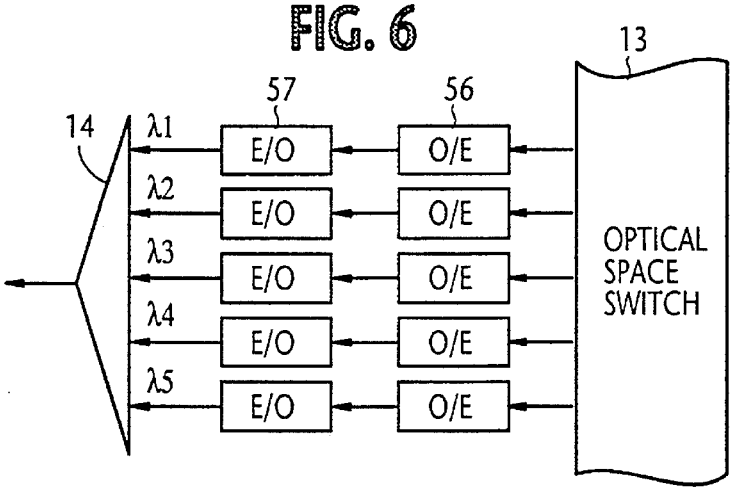
FIG. 6 is an illustration of the details of the fixed wavelength converters of FIG. 5.
Figure 7:
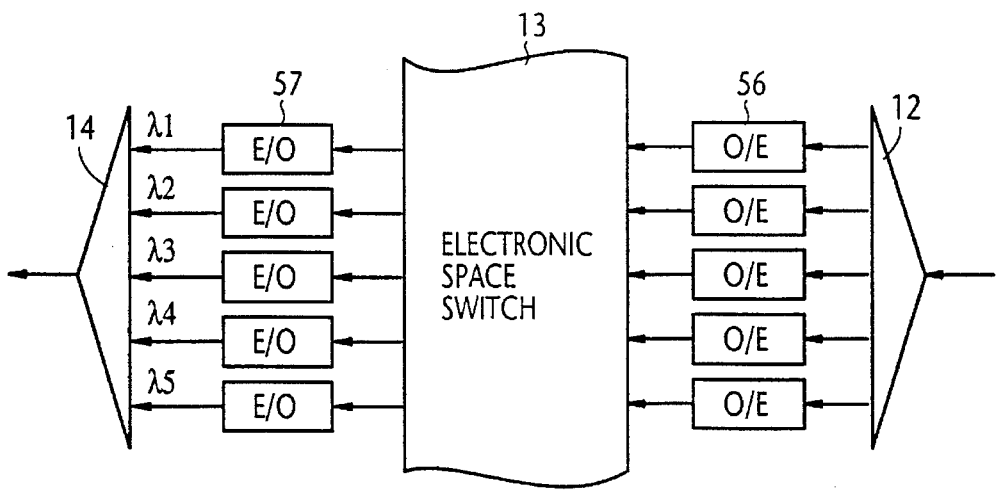
FIG. 7 is an illustration of a modification of FIG. 6.

Each of the fixed wavelength converters 55 may be implemented with an O/E converter (photodiode) 56 and an E/O converter (laser diode) 57 as illustrated in FIG. 6. However, if E/O converters 56 are removed from the outlet ports of switch 13 and provided at the inlet ports as shown in FIG. 7, the switch 13 can be implemented with an electronic space switch.

Figure 8:
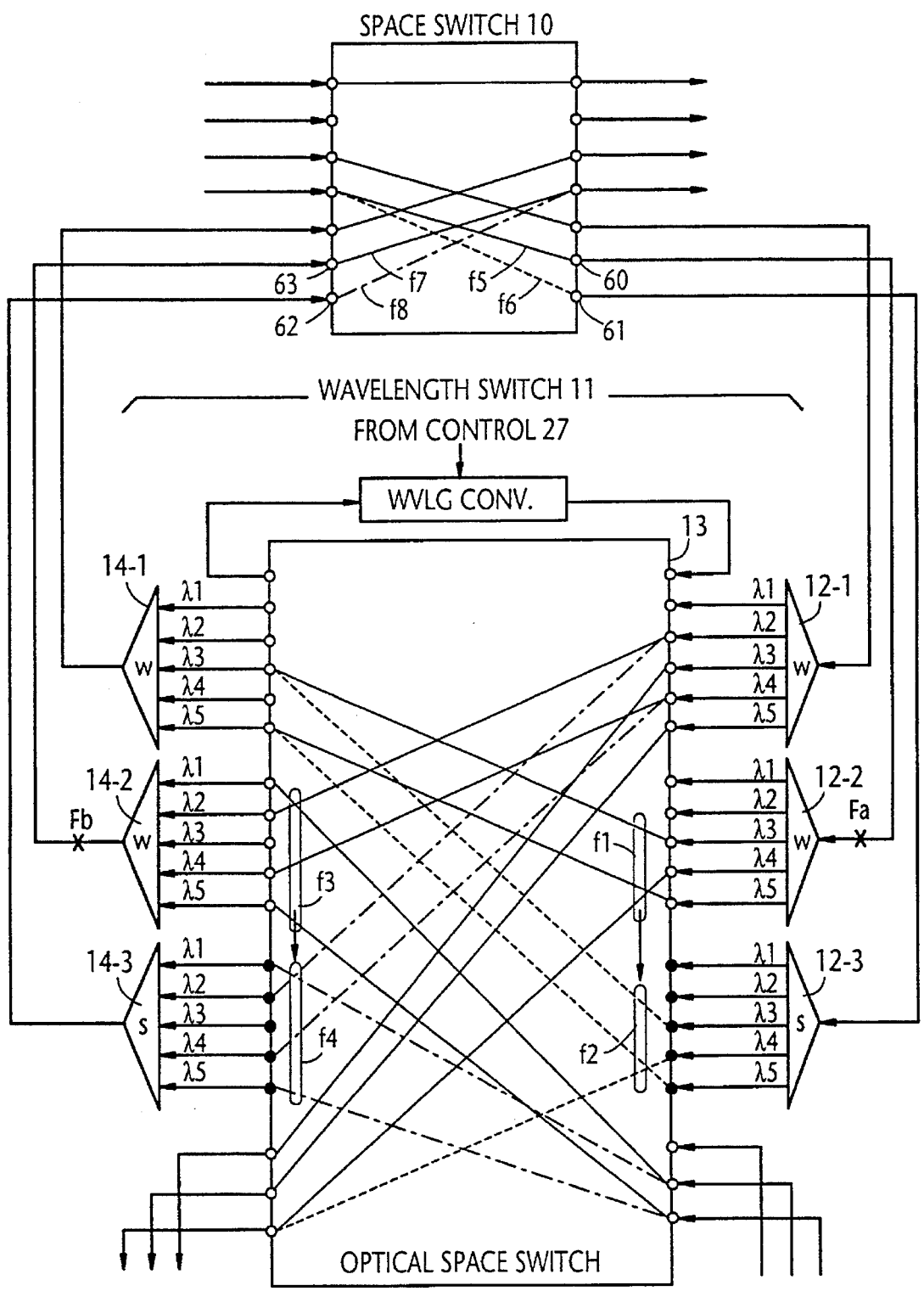
FIG. 8 is a block diagram of an optical cross-connect system of this invention illustrating recovery operations performed on locally recoverable faults.

FIG. 8 illustrates an example of locally restorable failures using the wavelength division switch of FIG. 3. At the inlet side of the WD switch, a WD demultiplexer 12-3 is provided in addition to working WD demultiplexers 12-1 and 12-2, and at the outlet side, a WD multiplexer 14-3 is provided in addition to working WD multiplexers 14-1 and 14-2.

If a fault occurs as shown at Fa at the input of demultiplexer 12-2, a set of links f1 is disconnected from the λ3, λ4 and λ5 outputs of the demultiplexer 12-2 and a set of links f2 is established to the corresponding outputs of the spare demultiplexer 12-3, while link f5 is disconnected in switch 10 from outlet port 60 and a link f6 is established to outlet port 61. In like manner, if a fault occurs as shown at Fb at the output of multiplexer 14-2, a set of links f3 is disconnected from the λ1, λ2, λ4 and λ5 outputs of the multiplexer 14-2 and a set of links f4 is established to the corresponding inputs of the spare multiplexer 14-3, while link f7 is disconnected in switch 10 from inlet port 62 and a link f8 is established to inlet port 63. Failures of this type can be recovered locally without involving adjacent nodes, and no failure report is communicated to the network center.

Figure 9:
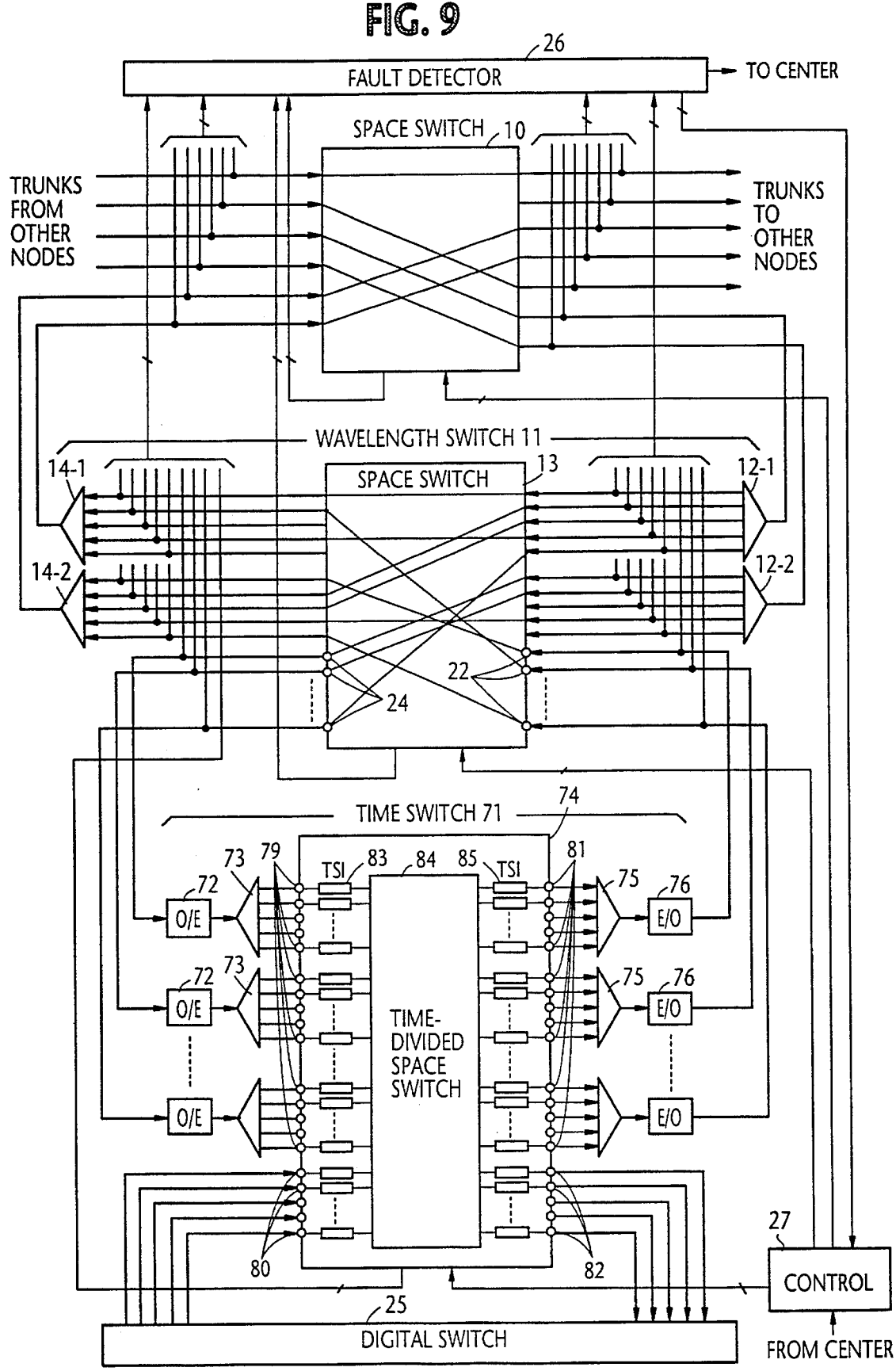
FIG. 9 is a block diagram of a WTDM (wavelength time division multiplex) cross-connect system of the present invention.

If the signals carried on the fiber optic trunks are wavelength-time division multiplex (WTDM) signals, a time division switching network 71 is interposed between the optical space switch element 13 of wavelength switching network 11 and the interface 25 of the switched network as shown in FIG. 9. Time switch 71 comprises a plurality of electrooptic converters 72 connected respectively to the outlet ports 24 of space switch element 13 for receiving optical TDM signals, time-division demultiplexers 73 for receiving the outputs of corresponding E/O converters 72, a time switch 74, time-division multiplexers 75, and electrooptic converters 76 of particular wavelengths. Time switching network 74 has a first group of outlet ports 79, a second group of outlet ports 80, a first group of outlet ports 81, and a second group of outlet ports 82. The outputs of all time-division demultiplexers 73 are connected to the inlet ports 79 and the inputs of all time-division multiplexers 75 are connected to the outlet ports 81. The outgoing traffic of digital switch 25 is terminated at the inlet ports 80 and the incoming traffic of the digital switch is received through the outlet ports 82.

The time switch 74 includes a time-divided space switch 84, a bank of input time slot interchangers 83 connected between the inlet ports 79, 80 and the inlets of space switch 84, and a bank of output time slot interchangers 85 connected between the outlets of switch 84 and outlet ports 81, 82.

The time switch 74 is controlled by a switching command signal from the control circuit 27.

Time-divided space switch 84 is capable of establishing time-division multiplex links between the input time slot interchangers 83 and the output time slot interchangers 85 on a per time slot basis with with zero blocking probability by the provision of sufficient number of space-switch time slots on each of the established links with additional spare links to support link failures. For fault detection purposes, the inputs of all O/E converters 72 and the outputs of all E/O converters 76 and the internal circuitry of the time switch 74 are connected to the fault detector 26.

Similar to wavelength switching network 11, cross-connections are established on a time slot basis between some of the inlet ports 79 and the outlet ports 82 and between the inlet ports 80 and some of the outlet ports 81. Some of the inlet ports 79 may be coupled to some of the outlet ports 81.

In this way, digital signals of a higher multiplex level are decomposed into a greater number of lower multiplex signals by time-division demultiplexers 73 and enter corresponding input time slot interchangers 83. In the space switch 84, a TDM link is established for each time-slot signal, and in each input time slot interchanger 83, each time-slot signal is switched from the incoming time slot to a selected space-switch time slot of the TDM link established for the time-slot signal and enters an output time slot interchanger 85, where the space-switch time slot is switched to the outgoing time slot having the same slot number as the incoming time slot, and appears at one input of a time-division multiplexer 75. The signal is multiplexed with other signals of the multiplexer and converted to an optical signal of particular wavelength by a corresponding E/O converter 76.

Recovery operations for faults associated with the space switch 10 and wavelength switch 11 are performed in the same manner as described above. If a link failure occurs in TDM space switch 75, a spare link is locally identified and the faulty link is switched to the spare link, and if a fault occurs at the input of one of the O/E converters 72 or at the output of one of the E/O converters 78 is detected, a fault recovery procedure similar to that described with reference to FIG. 8 is performed by the provision of a set of spare O/E converters and spare inlet time slot interchangers and a set of spare outlet time slot interchangers and spare E/O converters.

The operation of recovery for a fault that occurs in a time slot of any time slot interchangers will be described with reference to FIG. 10 by assuming that a communication channel is being established between adjacent network nodes A and B on time slot T1 using TSI 83-1 and 85-1 and the nodes A and B have a spare time slot T2 on outlet TSI 85-2 a commonly available channel.

To establish the communication channel on time slot T1, a TDM link 86 is set up in switch 74A of node A during slot T1 and the input TSI 83-1 provides time-slot interchanging from the time slot T1 of TDM input to a space-switch time slot Ti of link 86 which is established between TS interchangers 83-1 and 85-1, and the output TS interchanger 86-1 provides time-slot switching from the space-switch time slot Ti to time slot T1 of a TDM output.

In a similar manner, the inlet TS interchanger 83-1 at node B provides time-slot switching from the time slot T1 of the TDM input to a space-switch time slot Tj of a TDM link 88 which is established between TS interchangers 83-1 and 85-1, and the output TS interchanger 85-1 provides time-slot switching from the space switch time slot Tj to time slot T1 of a TDM output.

Figure 10:
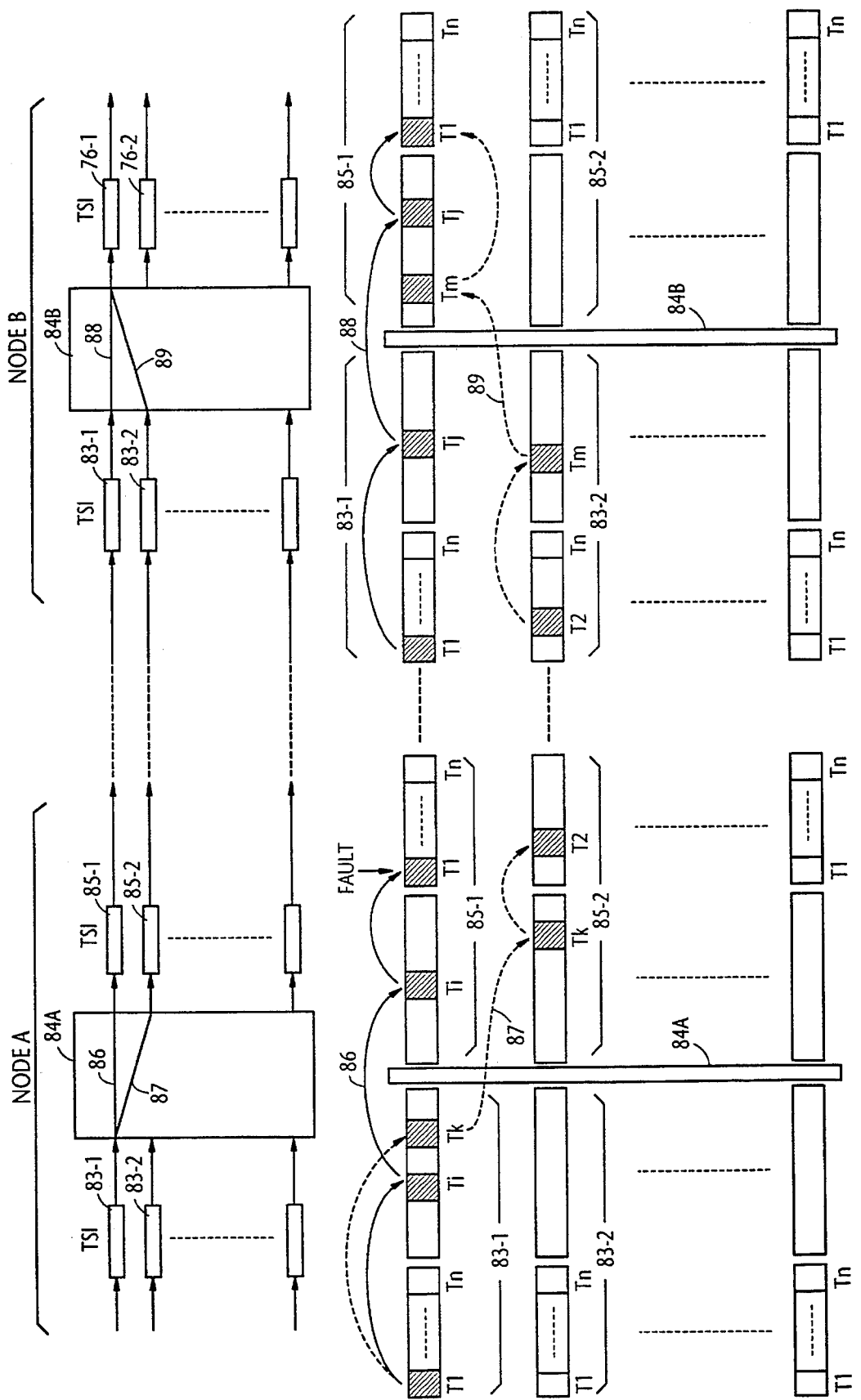
FIG. 10 is a block diagram of adjacent network nodes cooperating with each other for recovering a time slot associated fault.

If the outlet TS interchanger 85-1 of node A should fail at a point corresponding to time slot T1 as indicated by the arrow in FIG. 10, link 86 for T1 is cleared and a new link 87 is established during T1 between TS interchangers 83-1 and 85-2 at node A. Input TS interchanger 83-1 provides switching of slot T1 to space-switch time slot Tk on link 87 and the output TS interchanger 85-2 switches space-switch time slot Tk to the spare time slot T2.

At node B, link 88 is cleared and a new link 89 is established between TS interchangers 83-1 and 85-2. Input TS interchanger 83-1 provides switching of slot T2 to Tm on link 89 and the output TS interchanger 85-2 switches slot Tm to time slot T1.

A similar fault recovery procedure will be followed by nodes A and B if a fault occurs at a point in the input TS interchanger 83-1 of node B corresponding to time slot T1. If a spare-switch time slot is available on the currently established link in each of nodes A and B, link switching is not necessary and fault recovery is simply a switching from the failed slot to the spare slot in each of the nodes.

Figure 11:
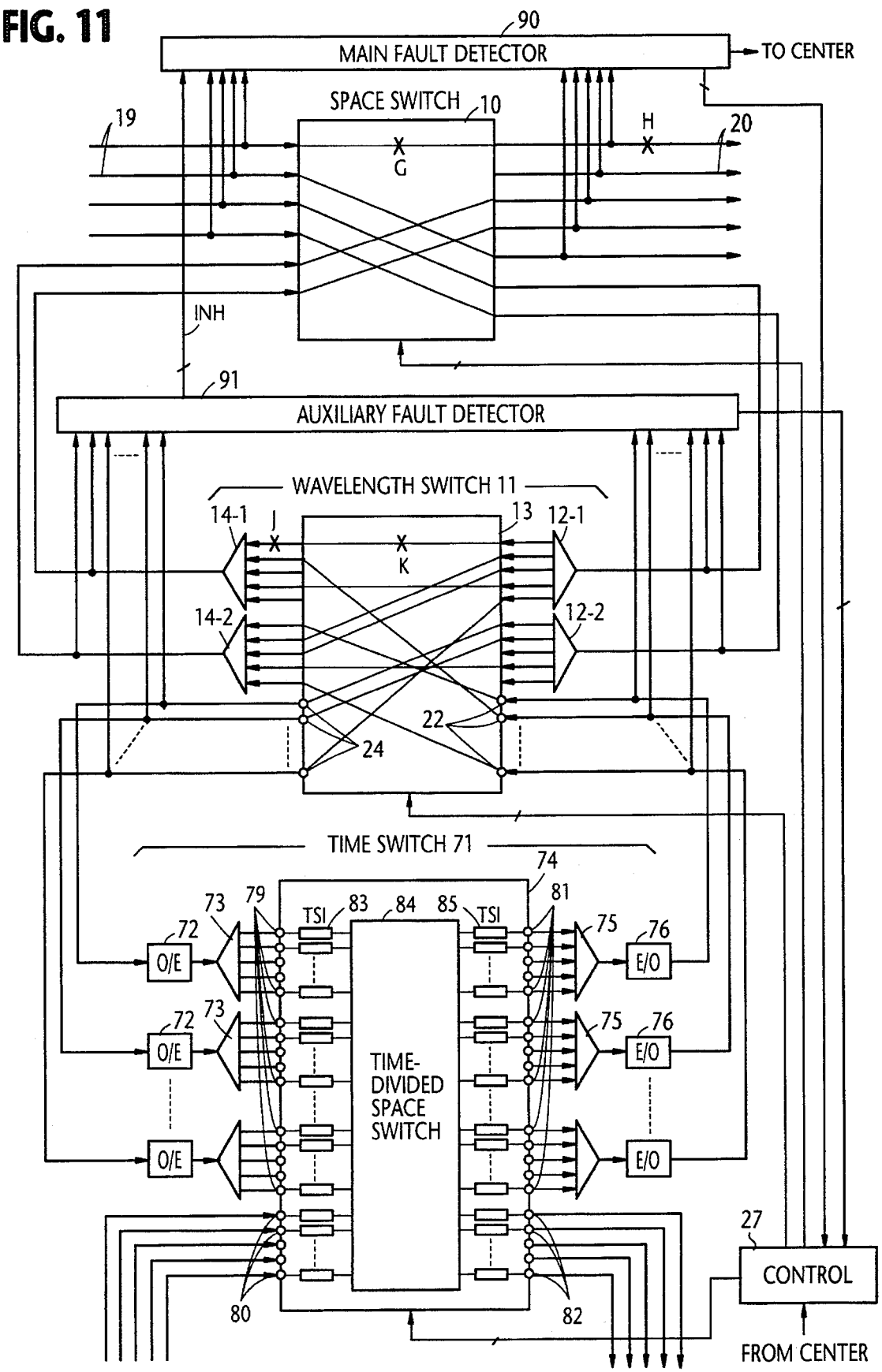
FIG. 11 is a block diagram of a modified WTDM cross-connect system of the present invention.

The embodiment of FIG. 9 is modified as shown in FIG. 11 in which a main fault detector 90 and an auxiliary fault detector 91 are provided. Main fault detector 90 is connected to the fiber trunks 19 and 20, while the auxiliary fault detector 91 is connected to the inputs and outputs of wavelength and time switches 11 and 71 for monitoring locally recoverable faults in addition to other faults and reports the detected events to the control circuit 27 and supplies an inhibit signal to the main fault detector 90 to prevent it from notifying the network center of the occurrence of a local trouble.

Figure 12:
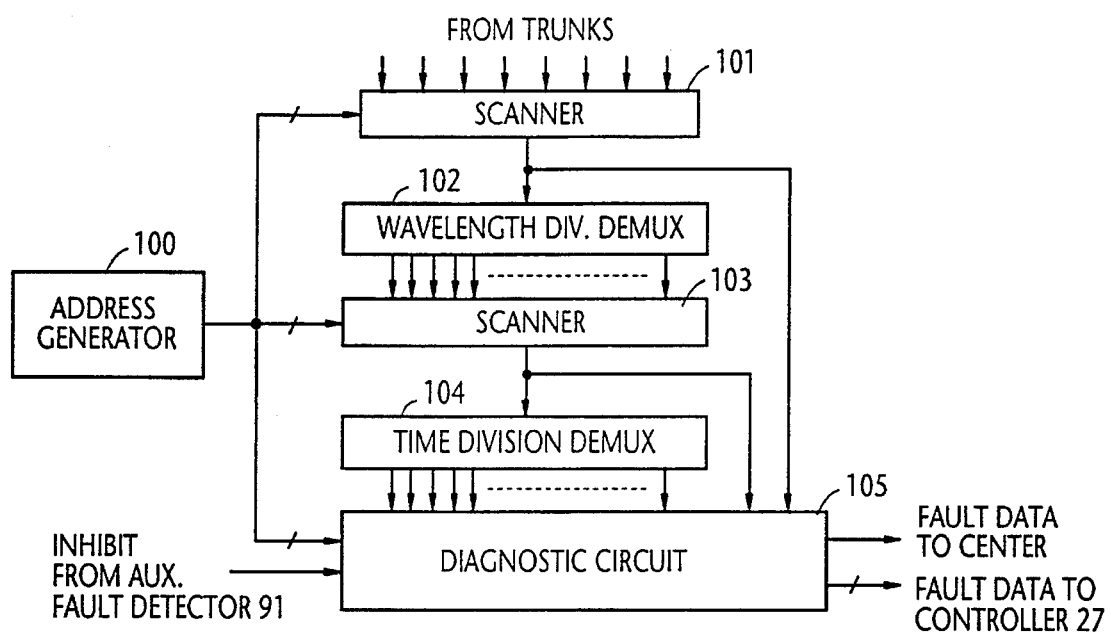
FIG. 12 is a block diagram of the main fault detector of FIG. 11.

As shown in FIG. 12, the main fault detector 90 comprises a scanner 101 which is driven by a control signal from an address generator 100 for scanning and sequentially coupling each of the incoming and outgoing fiber optic trunks 19 and 20 to a wavelength division demultiplexer 102 and to a diagnostic circuit 105. The WTDM signal from the scanned trunk is wavelength demultiplexed by demultiplexer 102 into the individual wavelength components of the signal. Each of these components is successively scanned by a second scanner 103 in response to the control signal from the address generator 100 and applied to a time division demultiplexer 104 where it is decomposed into individual time slot signals. The decomposed wavelength signal is also applied to the diagnostic circuit 105. Thus, the diagnostic circuit monitors all possible faulty conditions of the digital cross-connect system and determines whether the trouble is a trunk associated fault, a wavelength associated fault or a time slot associated fault. If a failure other than locally recoverable faults is detected, diagnostic circuit 105 reports to the network center as well as to the controller 27 the results of the diagnosis and the identification number of the faulty wavelength or time slot as indicated by the address given by the address generator 100.

If a trunk is suspected of being faulty, it is identified with a trunk number, which is communicated to the network center. If the failure is determined to be a wavelength associated trouble, it is identified with a wavelength number, and if it is determined to be a time slot associated trouble, it is identified with a time slot number. When a locally recoverable fault is detected by the auxiliary fault detector 91, the diagnostic circuit 105 receives the inhibit signal from the auxiliary fault detector 91.

Figure 13:
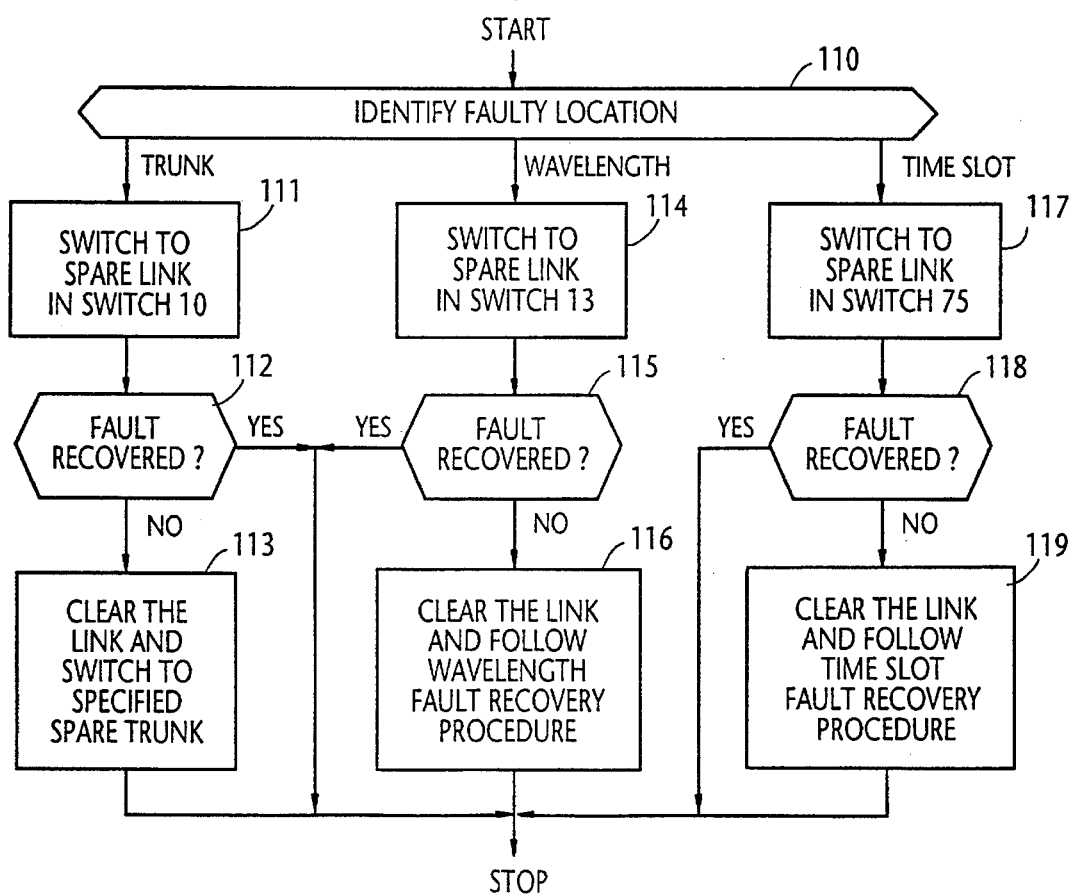
FIG. 13 is a flowchart of a program associated with the embodiment of FIG. 11, illustrating a sequential fault recovery process performed in response to node command signals from the network center.

The network center analyzes the diagnostic reports from several network nodes and issues node command signals as long as the fault condition is not removed and issues a recovery indication as soon as it is cleared. As illustrated in FIG. 13, the control circuit 27 is programmed to sequentially perform fault recovery processes in response to the node command signal and the recovery indication from the network center as well as in response to the analysis given by the auxiliary fault detector 90.

In FIG. 13, the program execution starts with decision step 110 by receiving a node command signal from the network center and a result of analysis given by the auxiliary fault detector 90. Control determines possible locations of the fault from the working and spare status memory. If the fault is determined to be associated with a fiber optic trunk, control circuit 27 suspects first that the fault is on a link as marked G in FIG. 11 and proceeds to step 111 to instruct the space switch 10 to establish a spare link in parallel with the suspected link. Control then proceeds to decision step 112 to ascertain whether the fault is recovered. If the answer is negative, control then suspects that the fault is on a trunk specified by the network center (as marked H) and branches to step 113 to clear the established spare link and establishes a link to a spare trunk specified by the network center.

If the fault is determined to be associated with a wavelength channel, control circuit 27 suspects first that the fault is on a link as marked K, for example, and proceeds to step 114 to instruct the space switch 13 to establish a spare link in parallel with the suspected link. Control proceeds to decision step 115 to check to see if the wavelength associated fault is recovered. If the answer is negative, control then suspects that the fault is on one of the inputs of a wavelength multiplexer 14 as marked J and branches to step 116 to clear the established spare link and follows the wavelength fault recovery procedure described previously in connection with FIG. 3 or 5.

If the fault is determined to be associated with a time slot, control circuit 27 suspects first that the fault is on a TDM link and proceeds to step 117 to instruct the space switch 75 to establish a spare TDM link in parallel with the suspected link. Control proceeds to decision step 118 to check to see if the time slot associated fault is recovered. If the answer is negative, control then suspects that one of the time slots of a time slot interchanger 76 has failed and branches to step 119 to clear the established spare link and follows the time slot fault recovery procedure described previously in connection with FIG. 10.

What is claimed is:

1. An optical cross-connect system comprising:

an optical space switch having a plurality of first inlet ports, a second inlet port, a plurality of first outlet ports and a second outlet port for establishing links between any of the inlet ports and any of the outlet ports, the first inlet ports being connected to incoming optical trunks and the first outlet ports being connected to outgoing optical trunks, each of the incoming optical trunks and each of the outgoing optical trunks carrying a wavelength division multiplexed signal;

at least a wavelength division demultiplexer having at least an input connected to at least the second outlet port of the optical space switch and a plurality of outputs;

at least a wavelength division multiplexer having at least an output connected to at least the second inlet port of the optical space switch and a plurality of inputs; and a wavelength-divided space switch having a plurality of first inlet ports, a plurality of second inlet ports, a plurality of first outlet ports and a plurality of second outlet ports for establishing links between any of the inlet ports and any of the outlet ports, the first inlet ports of the wavelength-divided space switch being connected to the outputs of the wavelength division demultiplexer, the first outlet ports of the wavelength-divided space switch being connected to the inputs of the wavelength division multiplexer, the second inlet ports and the second outlet ports of the wavelength-divided space switch being adapted for connection to a switched network.

2. An optical cross-connect system as claimed in claim 1, further comprising control means connected to one of the optical space switch and the wavelength-divided space switch for controlling at least one of the optical space switch and the wavelength-divided space switch in response to a command signal indicating a location of a fault in the cross-connect system and for recovering the fault.

3. An optical cross-connect system as claimed in claim 2, wherein the inlet ports and the outlet ports of the wavelength-divided space switch are assigned respective wavelengths, said system further comprising a tunable wavelength converter connected to said control means for converting an input wavelength to an output wavelength in response to a wavelength command signal, wherein said control means includes means for establishing a first link from one of the inlet ports of the wavelength-divided space switch to the tunable wavelength converter and a second link from the tunable wavelength converter to one of the outlet ports of the wavelength-divided space switch and for producing said wavelength command signal so that the output wavelength of the tunable wavelength converter is equal to the wavelength assigned to the outlet port of said wavelength-divided space switch to which an outlet port of the tunable wavelength converter is connected.

4. An optical cross-connect system as claimed in claim 2, wherein the inlet ports of the wavelength-divided space switch are assigned respective wavelengths, further comprising a plurality of fixed wavelength converters connected between the outlet ports of the wavelength-divided space switch and the inputs of the wavelength division multiplexer, each of the fixed wavelength converters converting an input wavelength to a particular output wavelength.

5. An optical cross-connect system comprising:

an optical space switch having a plurality of first inlet ports, a second inlet port, a plurality of first outlet ports and a second outlet port for establishing links between any of the inlet ports and any of the outlet ports, the first inlet ports being connected to incoming optical trunks and the first outlet ports being connected to outgoing optical trunks, each of the incoming optical trunks and each of the outgoing optical trunks carrying a wavelength time division multiplexed signal;

at least a wavelength division demultiplexer having an input connected to at least the second outlet port of the optical space switch and a plurality of outputs;

at least a wavelength division multiplexer having an output connected to at least the second inlet port of the optical space switch and a plurality of inputs;

a wavelength-divided space switch having a plurality of first inlet ports, a second inlet port, a plurality of first outlet ports and a second outlet port for establishing links between any of the inlet ports and any of the outlet ports, the first inlet ports of the wavelength-divided space switch being connected to the outputs of the wavelength division demultiplexer, the first outlet ports of the wavelength-divided space switch being connected to the inputs of the wavelength division multiplexer;

a time division demultiplexer having an input connected to at least the second outlet port of the wavelength-divided space switch and a plurality of outputs;

a time division multiplexer having an output connected to at least the second inlet port of the wavelength-divided space switch and a plurality of inputs; and a time switch having a plurality of first inlet ports, a plurality of second inlet ports, a plurality of first outlet ports and a plurality of second outlet ports for establishing links between any of the inlet ports and any of the outlet ports, the first inlet ports of the time switch being connected to the outputs of the time division demultiplexer, the first outlet ports of the time switch being connected to the inputs of the time division multiplexer, the second inlet ports and second outlet ports of the time switch being adapted for connection to a switched network.

6. An optical cross-connected system as claimed in claim 5, further comprising control means connected to one of the optical space switch, the wavelength-divided space switch, and the time switch for controlling at least one of the optical space switch, the wavelength-divided space switch, and the time switch in response to a command signal indicating a location of a fault in the cross-connect system and recovering the fault.

7. An optical cross-connect system as claimed in claim 6, wherein the inlet ports and the outlet ports of the wavelength-divided space switch are assigned respective wavelengths, said system further comprising a tunable wavelength converter connected to said control means for converting an input wavelength to an output wavelength in response to a wavelength command signal, wherein said control means includes means for establishing a first link from one of the inlet ports of the wavelength-divided space switch to the tunable wavelength converter and a second link from the tunable wavelength converter to one of the outlet ports of the wavelength-divided space switch and producing said wavelength command signal so that the output wavelength of the tunable wavelength converter is equal to the wavelength assigned to the outlet port of said wavelength-divided space switch to which outlet port the tunable wavelength converter is connected.

8. An optical cross-connect system as claimed in claim 6, wherein the inlet ports of the wavelength-divided space switch are assigned respective wavelengths, further comprising a plurality of fixed wavelength converters connected between the outlet ports of the wavelength-divided space switch and the inputs of the wavelength division multiplexer, each of the fixed wavelength converters converting an input wavelength to a particular output wavelength.

9. An optical cross-connect system as claimed in claim 6, wherein said time switch comprises:

a plurality of input time slot interchangers having respective inputs connected to the outputs of the time division demultiplexer;

a plurality of output time slot interchangers having respective outputs connected to the inputs of the time division multiplexer;

a time-divided space switch for establishing links on a per time slot basis between outputs of the input time slot interchangers and inputs of the output time slot interchangers, wherein said control means includes means for controlling each of the input time slot interchangers so that, in each input time slot interchanger, an incoming time slot is switched to a time slot of one of the established links and controlling each of the output time slot interchangers so that, in each output time slot interchanger, the time slot of the established link is switched to an outgoing time slot having a time slot number equal to the incoming time slot, and controlling one of the input time slot interchangers to switch the incoming time slot to a time slot of an established link and controlling a corresponding one of the output time slot interchangers to switch the time slot of the established link to a spare outgoing time slot having a time slot number different from the incoming time slot.

10. In a network management system having a network center and a plurality of network nodes, each of the network nodes comprising:

an optical cross-connect system comprising:

an optical space switch having a plurality of first inlet ports, a second inlet port, a plurality of first outlet ports and a second outlet port for establishing links between any of the inlet ports and any of the outlet ports, the first inlet ports being connected to incoming optical trunks and the first outlet ports being connected to outgoing optical trunks, each of the incoming optical trunks and each of the outgoing optical trunks carrying a wavelength division multiplexed signal;

at least a wavelength division demultiplexer having an input connected to at least the second outlet port of the optical space switch and a plurality of outputs;

at least a wavelength division multiplexer having an output connected to at least the second inlet port of the optical space switch and a plurality of inputs;

a wavelength-divided space switch having a plurality of first inlet ports, a plurality of second inlet ports, a plurality of first outlet ports and a plurality of second outlet ports for establishing links between any of the inlet ports and any of the outlet ports, the first inlet ports of the wavelength-divided space switch being connected to the outputs of the wavelength division demultiplexer, the first outlet ports of the wavelength-divided space switch being connected to the inputs of the wavelength division multiplexer, the second inlet ports and the second outlet ports of the wavelength-divided space switch being adapted for connection to a switched network;

fault network means for detecting a fault in the cross-connect system and reporting the detected fault to the network center; and control means for controlling at least one of the optical space switch and the wavelength-divided space switch in response to a command signal from the network center indicating a location of the fault in the cross-connect system and recovering the fault.

11. An optical cross-connect system as claimed in claim 10, wherein said control means includes means for sequentially performing a fault recovery process on each of the optical space switch and the wavelength-divided space switch in response to a command signal from the network center.

12. In a network management system having a network center and a plurality of network nodes, each of the network nodes comprising:

an optical cross-connect system comprising:

an optical space switch having a plurality of first inlet ports, a second inlet port, a plurality of first outlet ports and a second outlet port for establishing links between any of the inlet ports andy of the outlet ports, the first inlet ports being connected to incoming optical trunks and the first outlet ports being connected to outgoing optical trunks, each of the incoming optical trunks and each of the outgoing optical trunks carrying a wavelength time division multiplexed signal;

at least a wavelength division demultiplexer having an input connected to at least the second outlet port of the optical space switch and a plurality of outputs;

at least a wavelength division multiplexer having an output connected to at least the second inlet port of the optical space switch and a plurality of inputs;

a wavelength-divided space switch having a plurality of first inlet ports, a second inlet port, a plurality of first outlet ports and a second outlet port for establishing links between any of the inlet ports and any of the outlet ports, the first inlet ports of the wavelength-divided space switch being connected to the outputs of the wavelength division demultiplexer, the first outlet ports of the wavelength-divided space switch being connected to the inputs of the wavelength division multiplexer;

at least a time division demultiplexer having an input connected to at least the second outlet port of the wavelength-divided space switch and a plurality of outputs;

at least a time division multiplexer having an output connected to at least the second inlet port of the wavelength-divided space switch and a plurality of inputs;

a time switch having a plurality of first inlet ports, a plurality of second inlet ports, a plurality of first outlet ports and a plurality of second outlet ports for establishing links between any of the inlet ports and any of the outlet ports, the first inlet ports of the time switch being connected to the outputs of the time division demultiplexer, the first outlet ports of the time switch being connected to the inputs of the time division multiplexer, the second inlet ports and second outlet ports of the time switch being adapted for connection to a switched network;

fault detector means for detecting a fault in the cross-connect system and reporting the detected fault to the network center; and control means for controlling at least one of the optical space switch, the wavelength-divided space switch and the time switch in response to a command signal from the network center indicating a location of the fault in the cross-connect system and recovering the fault.

13. An optical cross-connect system as claimed in claim 12, wherein said control means includes means for sequentially performing a fault recovery process on each of the optical space switch, the wavelength-divided space switch and the time switch in response to a command signal from the network center.

* * * * *